Oct. 10, 1967  G. H. STRITE  3,346,199
FEED BLENDER AND CRUSHER
Filed June 12, 1964  2 Sheets-Sheet 1
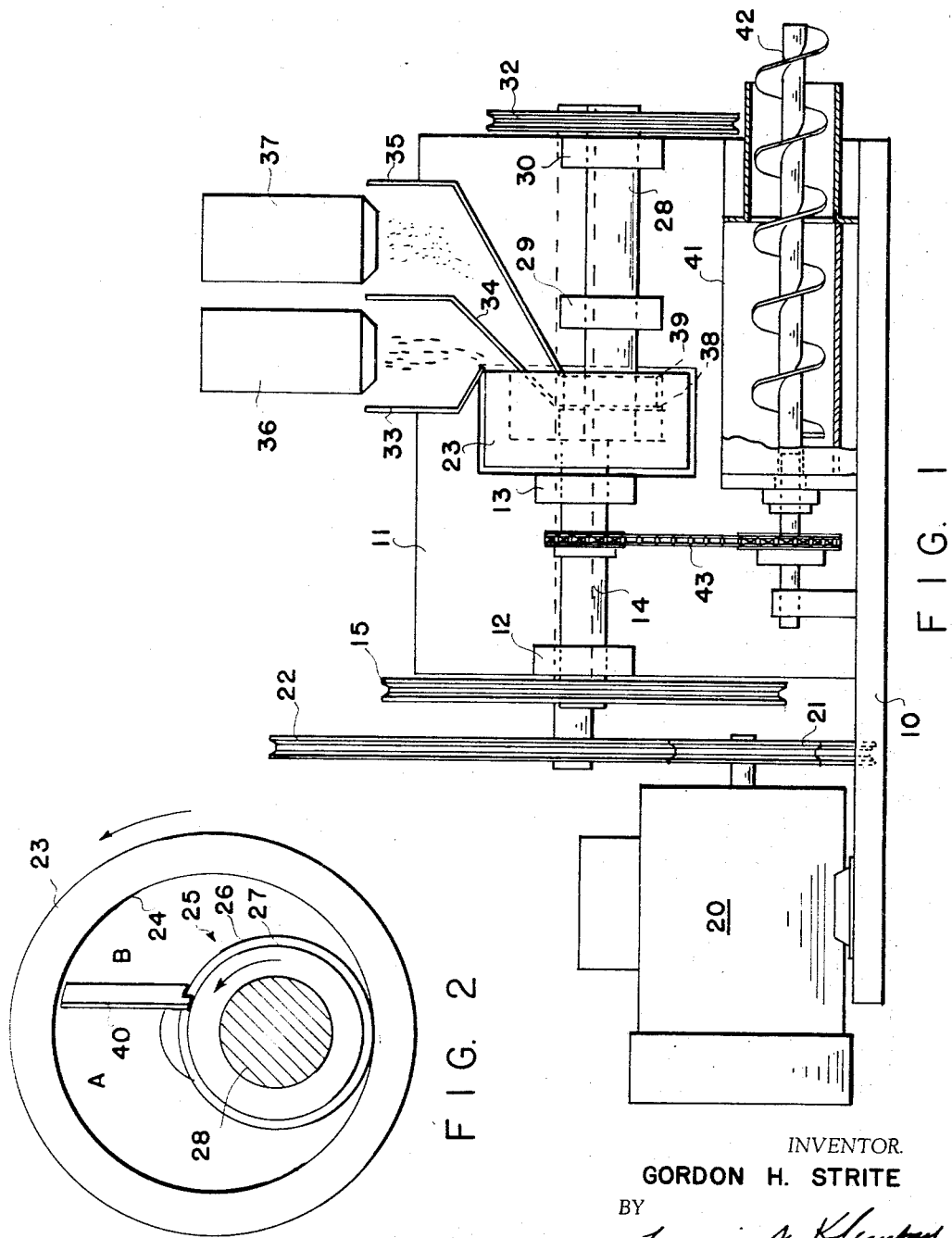
INVENTOR.
GORDON H. STRITE
BY
Francis J. Klempay
ATTORNEY Oct. 10, 1967    G. H. STRITE    3,346,199
FEED BLENDER AND CRUSHER
Filed June 12, 1964    2 Sheets-Sheet 2

INVENTOR.
GORDON H. STRITE
BY
*Francis J. Klempay*
ATTORNEY

United States Patent Office 3,346,199
Patented Oct. 10, 1967

3,346,199
FEED BLENDER AND CRUSHER
Gordon H. Strite, 805 Primrose Drive,
Belleville, Ill. 62221
Filed June 12, 1964, Ser. No. 374,792
4 Claims. (Cl. 241—144)

This invention relates to improved and simplified apparatus for preparing animal feeds, principally dairy feeds, from raw materials such as soybeans, grains and concentrates. It is desirable in the preparation of such feed not only to intermix the ingredients but to crack the kernels of the soybeans and grains to speed up the assimilation of the nutrients in the animal's digestive processes. It is neither desirable, necessary, or practical to carry the cracking processing to such a degree that the raw materials are completely crushed and a mash-like product results. In the prior art mills of which I am aware, however, the ingredients are fed intermixed into a grinder or crusher and, of course, the working pass or passes in such apparatus must be small enough to act on the smallest particles or grains of the raw ingredients. A most effective and common dairy feed is a mixture of soybeans, oats, dry kernel corn, and a prepared concentrate or supplement, all as well understood in the industry. If the spacing between crushing rolls, for example, is close enough to act on the oats, corn passing therethrough will be pulverized or flattened much beyond the mere cracking stage.

It is accordingly the primary object of the invention to provide an exceedingly simple and inexpensive mill to prepare animal feeds from both small and large grains which is operative to crack these grains and to intermix the same but which does not unnecessarily mash the grains. This object is accomplished, in accordance with the invention by providing a single unitary roller mill the pass through which has at least two sections one of which is of close dimension for small grain and the other of which is of larger dimension for larger grain.

Another object of the invention is the provision of an improved and simplified mill for crushing and blending grains and other ingredients in the manufacture of fully balanced animal feeds. This object is accomplished by mounting an open ended cylinder on a drive shaft for rotation about the axes of the shaft and cylinder and by providing a driven roller within the cylinder for rotation about an axis which is generally parallel to but offset with respect to said axes. There is thus provided a converging interstice between the cylinder and the roll to draw the ingredients into and through the crushing pass between the cylinder and the roller.

A further object of the invention is the provision in feed mills of the kind discussed above of improved arrangements for conducting the ingredients into the mill in separated relation, if required, and for discharging the completed product from the mill.

Yet another object of the invention is the provision of an improved feed mill having the operating characteristics above outlined but which is exceedingly simple in construction, low in power demand, and of compact construction whereby the same may be conveniently built into more comprehensive equipment used to automatically feed a dairy herd, for example.

The above and other objects and advantages of the invention will become apparent from the following specification and the accompanying drawing wherein there is disclosed a preferred embodiment of the invention.

In the drawing:

FIGURE 1 is a plan view, partly in section, of a feed mill constructed in accordance with the principles of my invention;

FIGURE 2 is a detailed end view, on an enlarged scale, of a portion of the apparatus of FIGURE 1.

Figure 3:
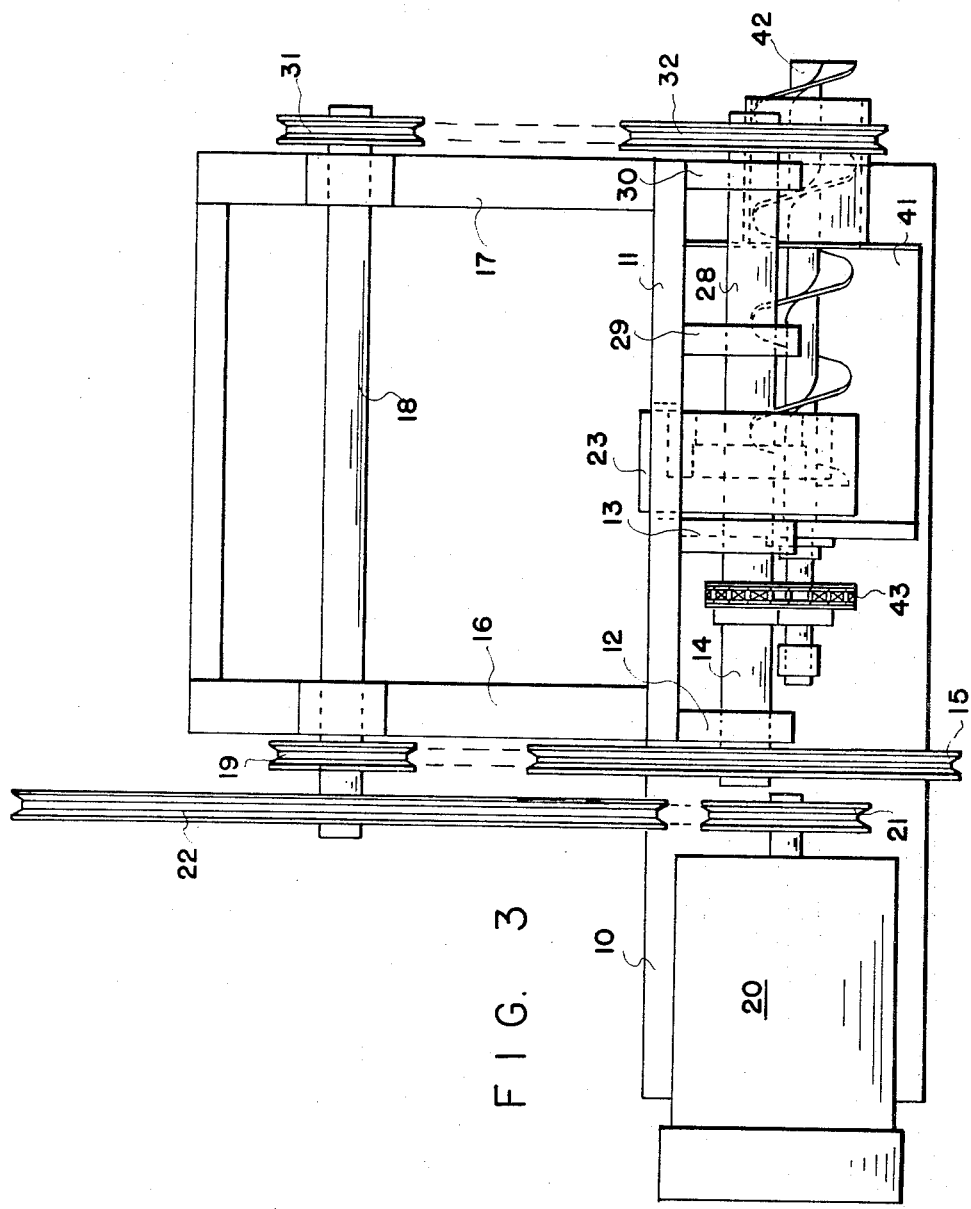
FIGURE 3 is a plan view of the apparatus of FIGURE 1.

In the drawing, reference numeral 10 designates a base plate on which is rigidly mounted, by welding or otherwise, an upstanding support plate 11. Journaled on the plate 11 by means of pillow block bearings 12 and 13 is a first shaft 14 driven by a belt pulley 15.

Rigidly connected to and extending rearwardly from the support plate 11 is a pair of spaced brackets 16 and 17 which journal a drive shaft 18 to which is keyed a pulley 19 for driving pulley 15 through a suitable belt suggested by the dash lines on FIGURE 3. Shaft 18 is driven by an electric motor 20 supported on base 10, the line of drive being through a small-diametered belt pulley 21 mounted on the motor shaft, the large diametered pulley 22 keyed to shaft 18 and the interconnecting belt indicated. It should be noted that the line of drive to shaft 14 provides for a considerable reduction in speed so that the shaft 14 operates at a speed sufficiently slow to properly handle the grain in the crusher to be hereinafter described and with sufficient torque to effect the crushing.

Formed integrally with or rigidly attached to the inner protruding end of the shaft 14 is a cup-shaped hub 23 having an open end and an inner cylindrical working surface 24. Cooperating with this surface 24 is a roll 25 having axially spaced cylindrical working surfaces 26 and 27 of different diameters. The roll 25 is preferably formed integral with a shaft 28 which is journaled on the support plate 11 by means of the pillow block bearings 29 and 30. In actual practice, the bearings 29 and 30 are adjustable on the plate 11 so that precise spacings may be effected and maintained between the cylindrical working surfaces 24, 26 and 27. Shaft 28 is driven from the drive shaft 18 by means of belt pulleys 31 and 32 and an interconnecting belt, all as shown in FIGURE 3. The diameters of these pulleys are so related to the diameters of the cylindrical working surfaces 26 and 27 that the latter would have substantial rolling contact with the surface 24 if the parts were so tightly adjusted that contact be made. In actual practice, however, even the larger diametered surface 26 is spaced from the surface 24 to permit passage of the grain during the crushing thereof.

As shown in the drawing, the larger diametered surface 26 is at the end of the shaft 28 and the surface 27 is immediately adjacent thereto, and the combined width of both these surfaces is approximately equal to the axial length of the surface 24 of the hub 23. By suitable trough means formed in part by deflectors 33, 34 and 35, I provide for the separate feeding of grains, beans and the like to the two crushing passes formed by the surfaces 26 and 27. Any suitable primary feeding means may be employed to convey the materials to be crushed to the crushing mill of this invention. Thus, I may provide a discharge nozzle 36 for feeding oats and soybeans, for example, between the deflectors 33 and 34 for guidance to the working surface 26 while a similar discharge nozzle 37 discharges dry shelled corn into the trough between deflectors 34 and 35 for guidance onto the crushing roll surface 27. As indicated in FIGURE 1, the deflector 34 is provided with a depending section 38 which fits within the lower portion of the hub 23 and about the cylindrical surface 27 in contact with the axial edge of surface 26 to provide, in effect, a pocket to confine the oats, soybeans, and the like until the same has been crushed by the surface 26. A similar depending extension 39 is provided for the deflector 35 to keep the grain coming from discharge nozzle 37 from spilling out of the bottom end portion of the hub 23 until such grain has been crushed.

Referring now to FIGURE 2, it will be noted that a baffle 40 is positioned in the hub 23 above the roller 25, and in actual practice this baffle is held immobile by suitable bracket means, not shown, carried by the support plate 11. The baffle 40 extends the entire axial length of the surface 24 of hub 23 and is stepped along its bottom edge to fit snugly over the surfaces 26 and 27 of the roller 25. The aforementioned extensions 38 and 39 extend from the left face of the baffle 40, as viewed in FIGURE 2 and, of course, the troughs formed in part by the diverters 33–35 discharge the raw materials to the left of the baffle into the space designated at A in FIGURE 2. As the grains and beans enter the space it will be obvious that they fall down into the interstices to the left of the roller 25 and are thereby drawn into the crushing passes formed between surfaces 24 and 26 and 24 and 27. As the rolling action continues, the crushed grain and beans are propelled upwardly into space 8 from which they are discharged by gravity from the open upper portion of the cup 23. These crushed materials then fall downwardly into a bin 41 where they are intermixed and from which they are propelled outwardly by a screw conveyor 42. Conveyor 42 may be conveniently driven from the shaft 14 by a chain and sprocket assembly designated generally by reference numeral 43. Concentrates and other feed materials requiring no crushing may, of course, be discharged directly into the bin 41 by means of a suitable feed device, not herein shown. This feed device as well as the feed apparatus for the crushing mill will normally be adjustable so that a predetermined proportion of raw ingredients will be prepared and intermixed in arriving at the finished feed to be delivered by the conveyor 42.

It should now be apparent that I have provided improved and simplified apparatus for preparing crushed animal feeds which accomplishes the objects initially set out. The apparatus is much more economical of materials, space and power than prior conventional mills which require rolls of large diameter and with deeply cut teeth to draw in large grain such as corn between the rolls. The configuration and relative motion of the crushing surfaces of the present apparatus is much more effective in drawing corn and other large grain into the crushing interstice between the rolls, all as will be evident upon an inspection of FIGURE 2. In the present device there is far superior gripping and pinching action between the two relatively movable crushing surfaces.

Of substantial practical merit is the arrangement whereby both large and small grains as well as soybeans and other foodstuffs may be simultaneously crushed to provide a balanced feed of maximum nutritional value. It is well recognized that the best feed is one in which the kernels are merely cracked without the production of flower and dust which is very objectionable. This obviously requires that the crushing pass for small grain such as oats be much smaller than the crushing pass for larger kernels such as dry shelled corn. The present invention provides for this through mechanical means of the utmost simplicity.

It should also be apparent that various changes and additions may be made in and to the apparatus specifically described herein without departing from the spirit or scope of the invention. For example, the surfaces 24, 26 and 27 may be lightly knurled, if desired, to assist in drawing the kernels of small grain and corn into the crushing passage. The knurls would be rather shallow so as to present little interference with the proper cracking of the grain in the crushing passes.

Having thus described my invention what I claim is:

1. Apparatus for preparing animal feeds comprising a cylinder having an open end and a closed end and mounted at its closed end for rotation about its longitudinal axis, means to power-drive said cylinder, a shaft journaled for rotation about an axis parallel to but offset with respect to said longitudinal axis and outwardly of the open end of said cylinder, means to drive said shaft, a roll carried by and concentric with said shaft and received within said cylinder in predetermined spaced relation to the side wall thereof, said roll being comprised of axially adjacent sections of different diameters both less than the diameter of said cylinder, the section of larger diameter being adjacent the closed end of said cylinder while the section of smaller diameter is adjacent the open end of said cylinder, a crescent-shaped divider plate normal to said axes and operative to separate the converging interstice between said cylinder and larger section from the converging interstice between said cylinder and smaller section, means to feed small grain to the first mentioned interstice and larger grain to the second mentioned interstice, and means to remove the grain emerging from said interstices.

2. Apparatus according to claim 1 further including a bin positioned below the open end of said cylinder to receive the crushed feed which spills out of the upper portion of said cylinder, and a driven screw conveyor positioned partly within said bin and extending outwardly of one side wall thereof to intermix the products of said interstices and to convey the same out of said bin.

3. Apparatus for preparing animal feeds comprising a base, an upstanding supporting plate rigidly mounted on said base, a first horizontal shaft journaled on said plate and mounting on its inner end a cup-shaped hub which is open at its free end, a countershaft journaled on said plate on the opposite side thereof from said first shaft, a motor mounted on said base for driving said countershaft, a second shaft journaled on said plate in parallel but offset relation to said first shaft, a roll mounted on the inner end of said second shaft and received within said hub to form with the internal surface of said hub a rolling pass to crush grains and the like conveyed into said hub, said roll being comprised of equally adjacent sections of different diameters, means to drive said second shaft from said countershaft, a crescent shaped divider plate fitting about said roll at the point of diameter change to separate the converging interstice between said hub and larger section from the converging interstice between said cylinder and smaller section, and means to feed small grain to one of said interstices and means to feed larger grain to the other of said interstices.

4. Apparatus according to claim 3 further including a bin below the open end of said hub, and a power-driven screw conveyor received partially within said bin and extending outwardly thereof through one side wall to intermix the crushed products which fall from said hub and to convey the same outwardly of said bin.

References Cited

UNITED STATES PATENTS

| | | |
|---|---|---|
| 1,358,354 | 11/1920 | Bellinger. |
| 2,186,066 | 1/1940 | Ford et al. _____ 241—167 X |
| 3,164,328 | 1/1965 | Van Dornick _____ 241—228 X |

FOREIGN PATENTS 459,889  9/1913  France.

ANDREW R. JUHASZ, *Primary Examiner.*